United States Patent [19]

Takada

[11] Patent Number: 4,861,259

[45] Date of Patent: Aug. 29, 1989

[54] MOLD CLAMPING DEVICE

[75] Inventor: Minoru Takada, Sakaki, Japan

[73] Assignee: Nissei Jushi Kogyo Kabushiki Kaisha, Nagano, Japan

[21] Appl. No.: 161,121

[22] Filed: Feb. 26, 1988

[30] Foreign Application Priority Data

Feb. 28, 1987 [JP] Japan .................. 62-045982
Mar. 20, 1987 [JP] Japan .................. 62-067606

[51] Int. Cl.$^4$ .................. B29C 45/67; F15B 11/02
[52] U.S. Cl. .................. 425/451.2; 91/440;
91/519; 92/111; 100/269 B; 100/273; 425/150;
425/419; 425/451.9; 425/590; 425/595
[58] Field of Search .................. 425/150, 419, 450.1,
425/451, 451.2, 451.3, 451.7, 451.9, 589–591,
595; 100/269 R, 269 B, 273, 289; 92/107–111,
142; 91/16, 415, 440, 441, 519

[56] References Cited

U.S. PATENT DOCUMENTS

| | | | |
|---|---|---|---|
| 3,786,725 | 1/1974 | Aoki | 91/519 |
| 3,818,801 | 6/1974 | Kime | 91/519 |
| 3,935,791 | 2/1976 | Hehl | 91/411 R |
| 4,079,617 | 3/1978 | Whiting | 100/269 B |
| 4,158,327 | 6/1979 | Aoki | 91/519 |
| 4,380,427 | 4/1983 | Hehl | 425/590 |
| 4,409,884 | 10/1983 | Boehringer | 92/108 |
| 4,565,116 | 1/1986 | Hehl | 425/590 |

FOREIGN PATENT DOCUMENTS 52-15627  5/1977  Japan .
56-24614  6/1981  Japan .
58-6616   2/1983  Japan .
60-3977   1/1985  Japan .

OTHER PUBLICATIONS

Stewart et al., ABC's of Hydraulic Circuits, Howard W. Sams & Co., Inc., Indianapolis, IN (1973), pp. 109–117.

Primary Examiner—James Housel
Attorney, Agent, or Firm—Birch, Stewart, Kolasch & Birch

[57] ABSTRACT

A mold clamping device is disclosed. The device includes a clamping ram, whose front end is connected to a moveable board of an injection molding machine, slidably fitted in a clamping cylinder, and a support cylinder provided in parallel to the clamping cylinder. A support piston is slidably positioned in the support cylinder, and the front end of the rod of the support piston is connected to the moveable board of the injection molding machine. A front chamber and a rear chamber of the clamping cylinder, divided by the piston section of the clamping ram, and a front chamber of the support cylinder are connected by an oil path. There is provided a valve for opening or closing the connection between the rear chamber of the clamping cylinder and the front chamber of the clamping cylinder and the front chamber of the support cylinder. The effective pressure receiving area of the rear chamber of the clamping cylinder is substantially equal to the sum of the effective pressure receiving area of the front chamber of the clamping cylinder and the front chamber of the support cylinder.

18 Claims, 6 Drawing Sheets

MOLD CLAMPING DEVICE

PRIOR ART DISCUSSION

This invention relates to a mold clamping device, and more specifically to a mold clamping device for injection molding machines and die casting machines.

In the direct pressure type mold clamping devices for injection molding machines and die casting machines, it is necessary to open or close the molds at a high speed or reduce the time of the molding cycle. It is also necessary to clamp the molds with great force to oppose the molding pressure to meet these requirements, such mold clamping devices having generally complex structures. Many different types of these devices exist.

For example, a booster-ram type mold clamping device is shown in FIG. 12. In this device, a smaller-diameter booster ram 11 is slidably fit into a larger-diameter clamping ram 10. Oil is introduced into the smaller-diameter cylinder chamber 13 of the clamping ram 10 via an oil path 12 provided in the booster ram 11 for high-speed mold closure. Oil is also introduced into a rear chamber 14 of the clamping ram 10 at a negative pressure from an oil tank 16 via a prefill valve 15. After mold closure, high-pressure mold clamping is conducted by closing the prefill valve 15 and introducing oil into the rear chamber 14 of the clamping ram 10.

However, in the above booster ram type mold clamping device, the rear chamber 14 of the clamping ram 10 is at a negative pressure with the high-speed advancing of the clamping ram 10. Attracting force introduces oil to the rear chamber 14 from the oil tank 16 so that there arise the following problems:

(1) The oil tank 16 requires a capacity larger than a mold clamping cylinder to prevent air suction so that the mold clamping devices are large.

(2) Upon introducing oil into the rear chamber 14 of the clamping cylinder from the oil tank 16 by suction, high-speed advancing movement will be unstable. The oil path provided between the oil tank 16 and the rear chamber 14 of the clamping cylinder and the prefill valve 15 should be large in diameter to reduce fluid resistance.

(3) On switching to tight clamping, shock often occurs because the oil pressure in the rear chamber 14 is changed from negative to high pressure quickly, and the time of the molding cycle is longer because rising pressure requires more time.

A mold clamping device is disclosed in Japanese Provisional Publication 53-42248 which comprises, a clamping piston, which is slidably fitted in a clamping cylinder, a clamping ram of the same diameter and a high-speed advancing cylinder provided on the front and rear faces of the clamping piston. An oil path is provided which can be opened or closed, connecting the front and rear chambers of the clamping cylinder, and a small-diameter booster ram which is slidably fitted into the high-speed advancing cylinder.

In this clamping device, in operating the clamping ram at a high speed by introducing oil into the high-speed advancing cylinder from the booster ram, there are no problems as stated above because the oil travels from the front chamber to the rear chamber without negative pressure in the rear chamber by connecting chambers provided on the front and rear sides of the clamping piston. However, with the structure of this device, the total length of the device should be more than twice as long as its clamping stroke so that the device is large, heavy, and expensive.

A mold clamping device for injection molding machines disclosed in Japanese Provisional Publication 57-115329 has the following construction. Namely, a plurality of liquid-pressure driven cylinders for opening molds are provided in parallel to a tight clamping cylinder. A piston is slidably fitted in the clamping ram of the clamping cylinder from the back. The liquid-pressure chamber of the liquid-pressure cylinder is connected to the front chamber of the clamping cylinder. The front chamber of the clamping cylinder is connected to the rear chamber thereof via an oil path provided in the piston section of the clamping ram. An open-close valve for opening or closing the oil path is operated by oil pressure independently.

In this device, for opening or closing molds, the oil in the front or rear chambers of the clamping cylinder and the oil in the liquid-pressure chamber of the liquid-pressure driven cylinder are moved via the oil path provided in the piston section of the clamping ram so that almost no negative pressure is generated in any sections in the cylinder and smooth movement occurs. Additionally, the clamping cylinder and the liquid-pressure driven cylinder are provided in parallel so that the total length of the device can be reduced.

There are also the following problems in this device:

(1) Because the mold opening operation is driven by the liquid-pressure driven cylinder, a plurality of the liquid-pressure driven cylinders must be provided on both sides of the clamping cylinder for balancing mold opening action as stated above.

(2) When the molds are opened, the oil chamber of the liquid-pressure driven cylinder is pressurized so that the chamber is connected to the front and rear chambers of the clamping cylinder for oil flow. Therefore, the oil pressure effects not only the chamber of the liquid-pressure driven cylinder but the front and rear chambers of the clamping cylinder so that the liquid-pressure driven cylinder must have a pressure proof structure. The front chamber of the clamping cylinder, which is not used for driving to open molds or to clamp tightly, also must have a pressure proof structure. With a pressure-proof structure, the device must be larger and heavier.

(3) The valve, which opens or closes the oil path, provided in the piston section of the clamping ram is controlled in its operation by the oil path provided in the clamping ram and extended in the axial direction thereof and by the oil circuit connected to the path whose one end is opened to the surface of the clamping ram located in the vicinity of a movable board and is connected to a hydraulic machine via external piping. However, with this structure, it is difficult to machine or assemble the clamping ram, and there are problems in durability and safety because of the connecting of the external piping to the movable clamping ram.

SUMMARY OF THE INVENTION

Therefore, this invention is provided to solve the above stated problems, and its objects are to provide a mold clamping device having high performance, whose total length is half that of conventional booster-rams, which has a simple structure, and which can be compacted, has a light weight, and can be marketed at low cost.

In the present invention, the mold clamping device has a clamping cylinder which slidably fits a clamping ram whose front end is connected to a movable board of an injection molding machine, and a support cylinder provided in parallel to the clamping cylinder. A support piston is slidably fitted in the support cylinder, and the front end of the rod of the piston can be connected to the movable board of the injection molding machine.

A front chamber and a rear chamber of the clamping cylinder, which are divided by a piston section of the clamping ram, and a chamber of the support cylinder are connected by an oil path to one another. There is provided a means in the oil path which opens or closes the oil path between the rear chamber and the front chamber and the chamber of the support cylinder.

In the present invention, the effective pressure receiving area of the rear chamber is designed to substantially equal the value which represents the sum of the effective pressure receiving area of the front chamber and the effective pressure receiving area of the chamber of the support cylinder.

According to the present invention, when the movable board and the support piston move together during high-speed mold closure, the rear chamber will not be at a negative pressure because the oil quantity supplied to the rear chamber from the the front chamber and the chamber of the support cylinder is equal to the required oil quantity of the rear chamber.

The high-pressure clamping is executed by the oil supplied to the rear chamber after closing the oil path to the rear chamber by the closing means. The opening and closing of the oil path can be performed by a switching valve.

The front and rear chambers can be connected by a connecting-through-hole provided in the piston section of the clamping ram, and an open-close valve can be provided in the oil path. This open-close valve is formed as a ring piston which is movably fitted on the rear end of the clamping ram, and the one end face of the ring piston opens or closes the oil path. The operation of this open-close valve is controlled by the oil flow from the front chamber to the rear chamber when the molds close. When the molds open, it is preferable that the oil in the opening chamber is supplied to a chamber which is formed by the inner face of the open-close valve and the outer face of the clamping ram.

The device of the present invention has the following advantages. In a high-speed mold closure operation, the rear chamber of the clamping cylinder will not be at a negative pressure so that quick pressurizing can be realized. The total length of the device can be half that of a conventional one so that the device can be reduced in size, weight, and cost. Furthermore, a complex valve, such as a prefill valve, is not necessary so that it will be easy to design and manufacture, and reliability and utility are increased.

The support cylinder is not used for pressurizing, and it affects the operation of the movable board insignificantly so the movement of the movable board can be balanced without provision of a plurality of support cylinders.

Mold closure or opening can be executed by the pressurizing of the chambers of the clamping ram only, so there is generated little pressure in the front chamber and chamber of the support cylinder throughout the cycle. A high degree of hardness is not required for the front lid of the clamping cylinder, the support cylinder, and the support piston, so that they can be simple and compact in structure.

The chamber formed by the inner face of the open-close valve and the outer face of the clamping ram is pressurized by the oil from a chamber of the clamping ram via a through-hole bored in the clamping ram to drive the open-close valve, and thus external piping is not necessary. Therefore, the present device will be easy to manufacture and assemble, and has a high durability and safety.

BRIEF DESCRIPTION OF DRAWINGS

The objects and advantages of the invention will be apparent from the following description, and the accompanying drawings, which are provided for illustration only and do not limit the invention, wherein.

DETAILED DESCRIPTION OF THE PREFERRED EMBODIMENTS

Figure 1:
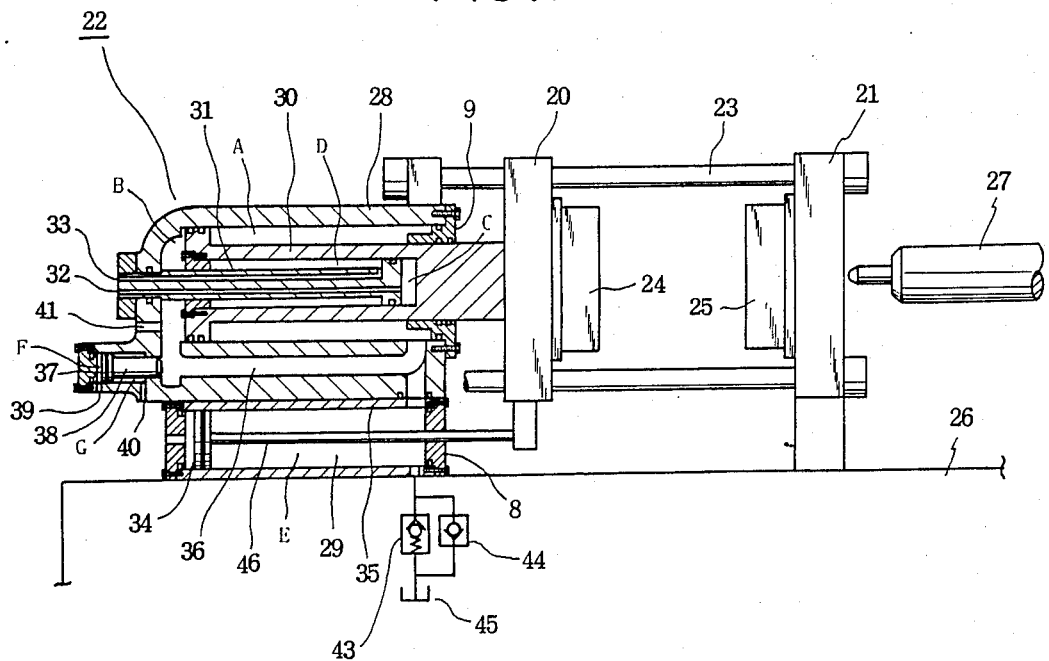
FIG. 1 shows a cross sectional view of the mold opening status of the device according to a first embodiment of the present invention.

The preferred embodiments of the invention will be described in detail with reference to accompanying drawings, but the invention is not to be construed as being limited to these particular embodiments.

It should be noted that like parts are designated by like reference numerals.

EMBODIMENT 1

Figure 2:
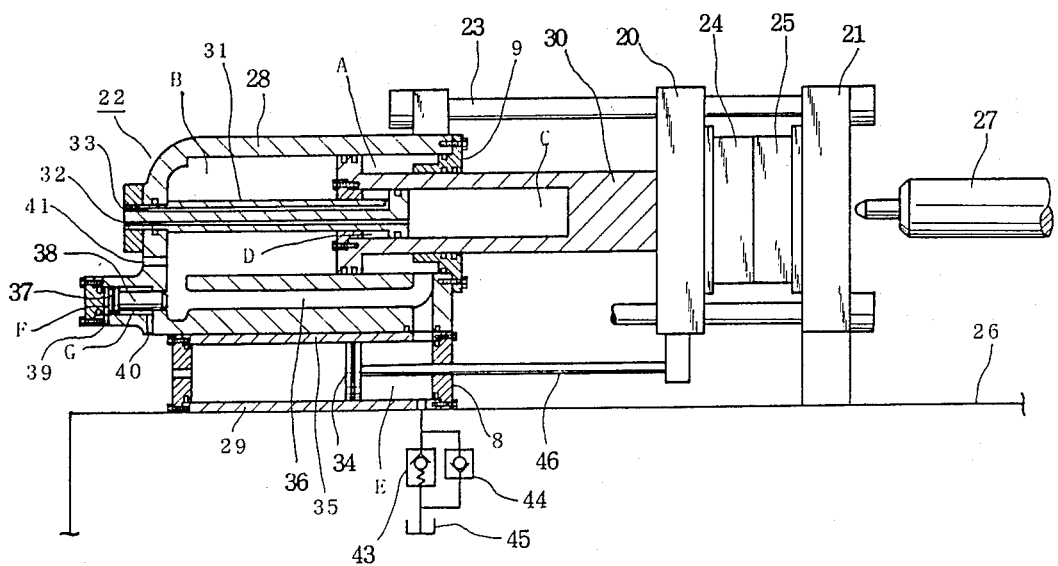
FIG. 2 shows a cross sectional view of the high-speed mold closing status according to a first embodiment of the present invention.
Figure 3:
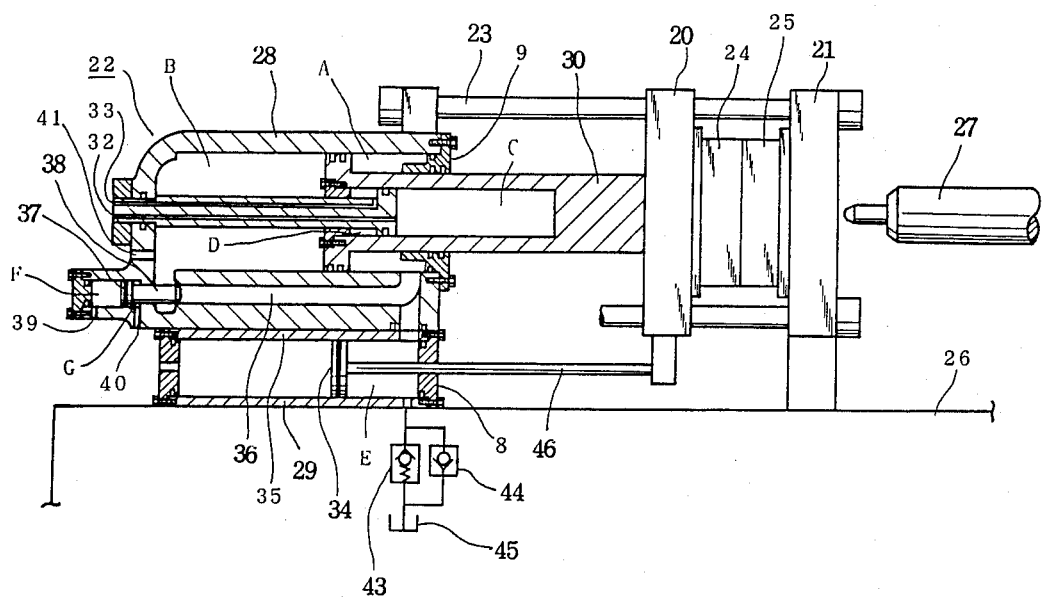
FIG. 3 shows a cross sectional view of the tight clamping status according to a first embodiment of the present invention.

In FIGS. 1 to 3, a movable board 20 is guided to move to and away from a fixed board 21 by a tie bar 23 which is bridged between the fixed board 21 and a cylinder block 22. On each opposite face of the movable board 20 and the fixed board 21, there are provided a movable mold 24 and a fixed mold 25 respectively. On a base 26 provided at the rear side of the fixed board 21, there is provided an injection machine 27 which can be moved to and away from the fixed mold 25. There are further provided a clamping cylinder 28 and a support cylinder 29 which are arranged in parallel in the cylinder block 22. A clamping ram 30 whose front end is connected to the rear face of the movable board 20 is slidably fitted in the clamping cylinder 28 through the front lid 9. The inner space of the clamping cylinder 28 is divided into a front chamber A (described as chamber A later) and a rear chamber B (described as chamber B later) by the large-diameter piston section of the clamping ram 30.

A high-speed piston 31 whose rear end is fixed to the inner rear wall of the clamping cylinder 28 is slidably fitted in the clamping ram 30. The inner space of the clamping ram 30 is thereby divided into a chamber C and a chamber D by the large-diameter piston section provided at the front end of the high-speed piston 31.

The chambers C and D are respectively connected to a hydraulic machine (not shown) provided outside of the cylinder block 22 via oil paths 32 and 33 bored in the high-speed piston 31.

As shown in FIG. 1, the total length of the device including the clamping cylinder 28 is decreased because the large-diameter piston section of the clamping ram 30 is provided at the rear end thereof and the large-diameter piston section of the high-speed piston 31 is provided at the front end thereof.

A support piston 34 is slidably fitted in the support cylinder 29. The piston rod 46 of the support piston 34 is connected to the rear face of the movable board 20 passing through a lid 8 of the support cylinder. Therefore, the support piston 34 slides in the inner space of the support cylinder 29, and at that time the support piston 34 and the movable board 20 move together. There is formed a chamber E by the support piston 34 in the inner space of the support cylinder 29. The rear chamber of the support cylinder 29 is opened to the atmosphere.

There is provided an oil path 36 in a wall 35 between the clamping cylinder 28 and the support cylinder 29. The oil path 36 connects the chambers A and B of the clamping cylinder 28 and the chamber E of the support cylinder 29 to one another. In the vicinity of the oil path 36 there is formed a high-pressure switching cylinder 37. The oil path 36 is opened or closed by a high-pressure switching piston 38 which is slidably fitted in the high-pressure switching cylinder 37.

Chambers F and G are formed by the high-pressure switching piston 38 in the high-pressure switching cylinder 37.

Elements 39 and 40 are an oil port to the chambers F and G. Element 41 is an oil port to the chamber B.

The chamber A or E is connected to an oil tank 45 via a spring-check valve 43 and a check valve 44 which are provided in parallel and facing opposite directions.

One feature of the invention is that the sum of the effective pressure receiving area of the chamber A of the clamping cylinder 28 (the area of the piston section of the clamping ram 30 minus the area of the rod section thereof) and the effective pressure receiving area of the chamber E of the support cylinder 29 (the area of the piston section of the support piston 34 minus the area of the rod section thereof) is formed substantially equal to the effective pressure receiving area of the chamber B of the clamping cylinder 29 (the area of the piston section of the clamping ram 30 minus the area of the small-diameter section of the high-speed piston 31). The action of the device is described below. The high-speed mold closure:

In a mold opening status shown in FIG. 1, the high-speed mold closure is executed by supplying the oil to the chamber C, and then the oil in the chamber D is returned to the oil tank 45. The oil in the chambers A and E which is compressed by the advancing movable board 20 travels to the chamber B via the oil path 36. In this case, the pressure in the chamber B will not be negative because the sum of the effective pressure receiving area of the chambers A and E is substantially equal to the effective pressure receiving area of the chamber B so that the quantity of discharged oil from the chambers A and E is equal to the required quantity for the chamber B. The tight clamping:

Following the high-speed mold closure by pressurizing the chamber C, after closing the mold (FIG. 2) with low speed and low pressure by reducing oil flow to the chamber C, tight clamping is executed by supplying oil to the chamber B. At that time, the oil path 36 is closed by advanced high-pressure switching piston 38 while pressurizing the chamber F. As the chamber B is not at a negative pressure, the pressure rises quickly.

In this condition, the injection machine 27 is advanced and injects resin melt into the mold. After cooling and solidifying the resin, it is transferred to the next manufacturing step. The mold opening:

After cooling and solidifying the resin, high-pressure mold opening is executed. At that time, the pressure in chamber B is reduced, and chamber G is pressurized to retract the high-pressure switching piston 38. Then, high-pressure and small quantity of oil are supplied to the chamber D to open the mold under high pressure.

After the high-pressure opening, the high-speed opening is executed by increasing the oil quantity. Then the oil quantity is reduced again to reduce the opening speed shortly before the completion of the mold opening. Finally, the opening is completed by stopping the oil supply. In this case, the oil discharged from the chamber B is returned to the chambers A and E, and the oil in chamber C is returned to the oil tank 45.

The spring-check valve 43 works to keep the tight clamping pressure at a constant level as a safety valve so it releases the compressed oil in the chambers A and E to the oil tank 45 during the tight clamping.

The check valve 44, while transferring from the tight clamping operation to the mold opening operation and relieving the pressure in the chamber B, works to prevent negative pressure in the chambers A and E for a short period by sucking the oil from the oil tank whose quantity is equal to the oil quantity relieved from the chambers A and E. This can be translated into a smooth mold opening step.

In this invention, the effective pressure receiving area of the chamber B is basically designed to be equal to the sum of the effective pressure receiving area of chambers A and E, but there actually occur measuring errors in the manufacturing process so it is difficult to satisfy this standard. There are cases in which the effective pressure receiving area of the chamber B is a little greater than the sum of chambers A and E, or there are cases in which it is smaller. In the former cases, at the time of closing the mold, the oil quantity in chambers A and E is reduced so extra oil is sucked from the oil tank 45 via the check valve 44, while at the time of opening of the mold, the surplus oil is returned to the oil tank 45 via the spring-check valve 43. In the latter case, at the time of closing the mold, there is some surplus oil in the chambers A and E so it is returned to the oil tank 45 via the spring-check valve 43, while at the time of opening of the mold, the reduced quantity of oil is sucked from the oil tank 45 via the check valve 44.

A structure including the spring-check valve 43 and the check valve 44 is much easier to design because it is hardly necessary to consider the measuring errors.

In the above described embodiment, it is acceptable if the clamping cylinder 28 and the support cylinder 29 are not in one body, and the oil path 36 can be formed by a prescribed joint hose. Furthermore, the section of the high-speed switching cylinder 37 can be substituted by a prescribed external valve device (not shown). It is preferable to construct a differential oil circuit between chambers C and D at the time of high speed advancing to equalize the advancing speed and the retracting speed.

EMBODIMENT 2

Figure 5:
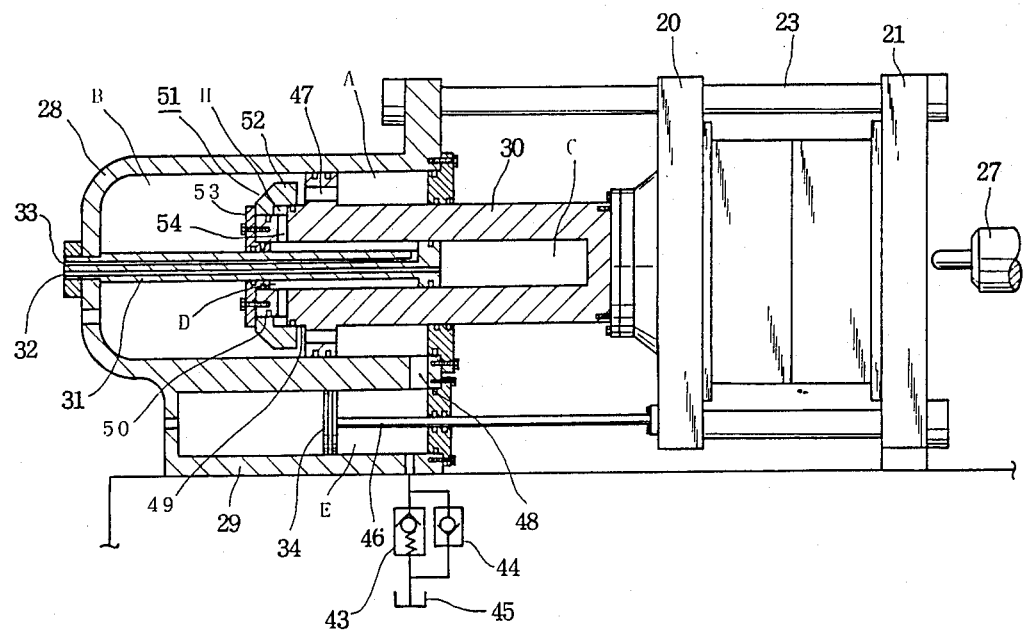
FIG. 5 shows a cross sectional view of the high-speed mold closing status according to a second embodiment of the present invention.
Figure 6:
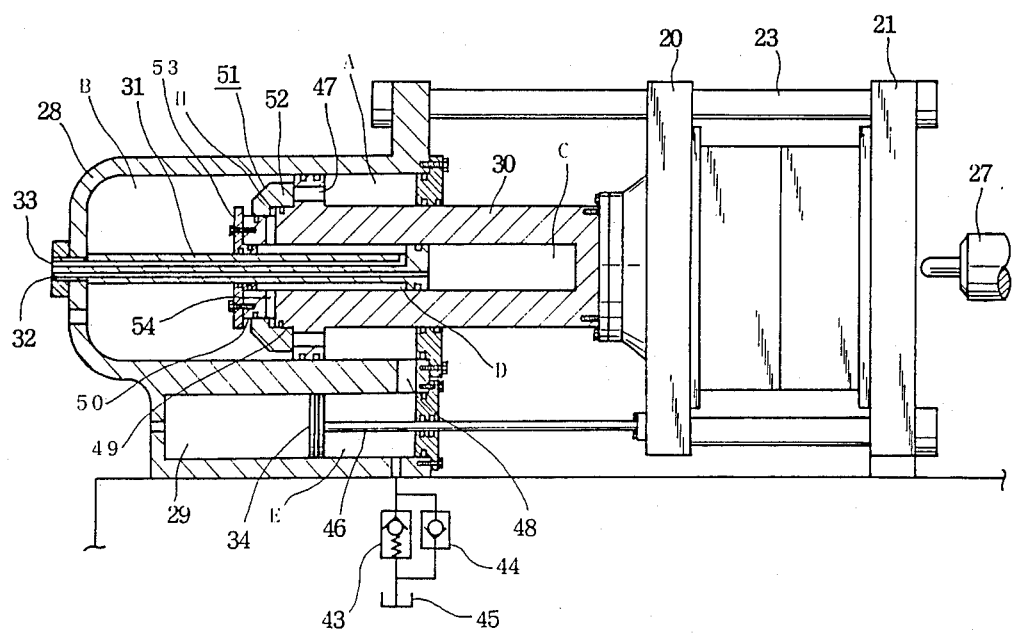
FIG. 6 shows a cross sectional view of the tight clamping status according to a second embodiment of the present invention.

The second embodiment of the invention will be described with reference to FIGS. 4 to 6.

Chambers A and B are connected by a connecting-through-hole 47 provided in a large-diameter section of a clamping ram 30.

The chamber A and a chamber E are connected to each other by an oil path 48 provided in a wall which is present between the clamping cylinder 28 and support cylinder 29.

The rear end section of the clamping ram 30 is extended into the chamber B.

The extended section of the clamping ram 30 in the chamber B is composed of a large-diameter section 49 and a small-diameter section 50 extended from the large-diameter section 49. On the small-diameter section 50, there is fitted an open-close valve 51, which opens or closes the connecting-through-hole 47. The open-close valve 51 is movable in the axial direction of the clamping ram 30, and it is formed like a ring piston. The sleeve section 52 of the open-close valve 51 is guided along the outer face of the large-diameter section 49, and an end face of the sleeve section can close the connecting-through-hole 47. A cap 53 is screwed on the end face of the small-diameter section 50 to prevent slip-out and to restrict traveling length. A chamber H is formed by the inner face of the open-close valve 51 and the outer face of the small-diameter section 50. The chambers H and D are connected by a through-hole 54 bored in the clamping ram 30.

Figure 4:
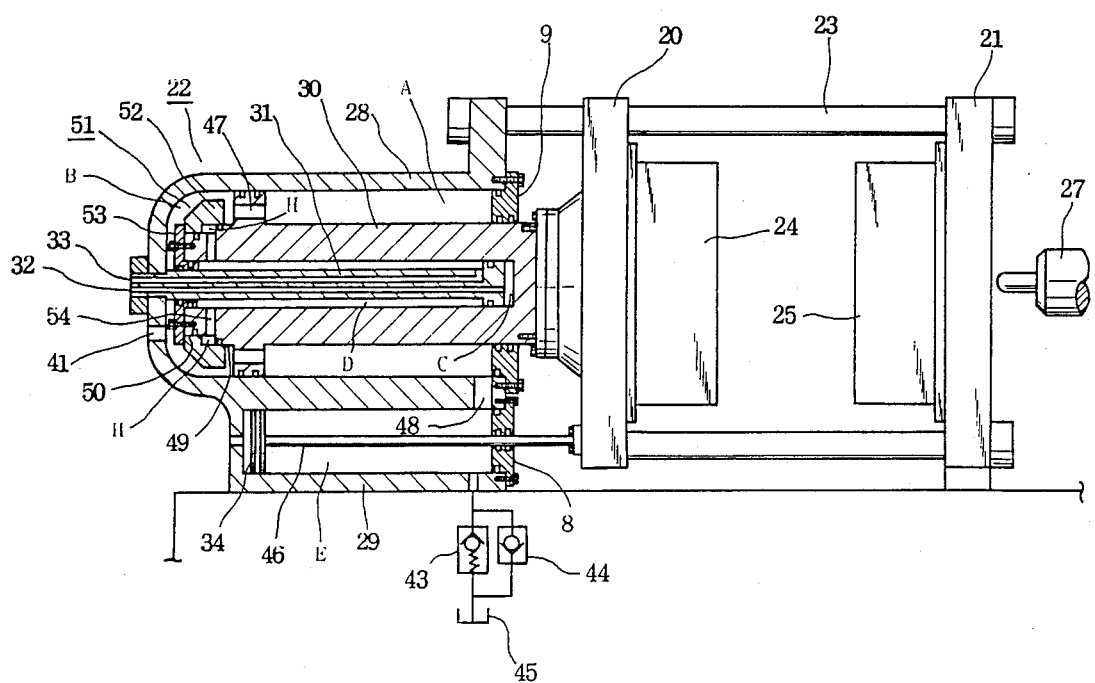
FIG. 4 shows a cross sectional view of the mold opening status of the device according to a second embodiment of the present invention.

In this embodiment, the sum of the effective pressure receiving area of the chamber A of the clamping cylinder 28 (the area of the piston section of the clamping ram 30 minus the area of the rod section thereof) and the effective pressure receiving area of the chamber E of the support cylinder 29 (the area of the piston section of the support piston 34 minus the area of the rod section thereof) is also designed to be substantially equal to the effective pressure receiving area of the chamber B of the clamping cylinder 28 (the area of the piston section of the clamping ram 30 minus the area of the small-diameter section of the high-speed piston 31). The action of the device of this embodiment will be described below. The high-speed mold closure:

In the condition of opening the mold shown in FIG. 4, the high-speed mold closure is executed by supplying oil to the chamber C. At that time, the oil in the chamber D is returned to the oil tank 45.

The oil in the chambers A and E, which is compressed by advancing the movable board 20, travels to the chamber B via the connecting-through-hole 47. In this case, for the sum of the effective pressure receiving area of the chambers A and E to be substantially equal to the effective pressure receiving area of the chamber B, the oil quantity discharged from the chambers A and E will be equal to the oil quantity which is needed for the chamber B so that the chamber B will not be at negative pressure.

For the chambers A and B to be connected to each other, the open-close valve 51 is moved in the position to open the connecting-through-hole 47 by oil resistance which occurs when the piston section of the clamping ram 30 travels. The tight clamping:

Following the high-speed mold closure by pressurizing in the chamber C, the chamber B is pressurized after mold closure (FIG. 5) with low-speed and low-pressure by reducing oil flow to the chamber C. When the chamber B is pressurized, the chambers A and E are also pressurized via the connecting-through-hole 47 but the pressure therein is reduced to the spring's exerting pressure of the check valve 43 so that the pressure-difference occurs between the front and rear faces of the open-close valve 51. Then the valve 51 advances and the end face of the sleeve section 52 comes into contact with the piston section of the clamping ram 30 to close the connecting-through-hole 47 (FIG. 6).

The oil supplied to the chamber B works to the rear end face of the clamping ram 30 for the tight clamping. In this case, pressurizing in the chamber C is executed simultaneously, and the pressure in the chamber C also works for the tight clamping. In this status, maintaining the pressure, the injection machine 27 is advanced and injects resin melt into the molds for injection molding. The resin is thereafter cooled for solidification and transferred to the next mold opening step. The mold opening:

After resin solidification, the pressure of chamber B is reduced and chamber D is pressurized for mold opening.

In this case, for chamber H to be pressurized via the through-hole 54 when chamber D is pressurized, chambers A, B and E are connected by retracting the open-close valve 51, and the oil in the chamber B travels to the chamber A and E following retracting of the clamping ram 30 and the support piston 34. The oil in chamber C is returned to the oil tank 45.

In this embodiment, the spring-check valve 43 also works to keep the tight clamping pressure constant as a safety valve so it releases the compressed oil in the chambers A and E to the oil tank 45 in the tight clamping procedure.

The check valve 44, while transferring from the tight clamping procedure to opening the mold and relieving the pressure in the chamber B, works to prevent negative pressure in chambers A and E for a short time period by sucking the oil from the oil tank whose quantity is equal to the oil quantity relieved from the chambers A and E. This can be transferred to a smooth mold opening.

In this embodiment, the effective pressure receiving area of chamber B is basically designed to be equal to the sum of the effective pressure receiving area of chambers A and E, but there actually occur measuring errors in the manufacturing process so it is very difficult to be equal to the above value. Thus, there are cases in which the effective pressure receiving area of the chamber B is greater than the sum of chambers A and E, or smaller. In the former cases, at the time of closing the mold, the oil quantity in the chambers A and E is reduced so that extra oil is sucked from the oil tank 45 via the check valve 44, while at the time of opening the mold, the surplus oil is returned to the oil tank 45 via the spring-check valve 43. In the latter cases, at the time of closing the mold, there is some surplus oil in the chambers A and E so it is returned to the oil tank 45 via the spring-check valve 43, while at the time of opening the mold, the reduced amount of oil is sucked from the oil tank 45 via the check valve 44.

This structure, including the spring-check valve 43 and the check valve 44, is easier to design because it is hardly necessary to consider the measuring errors.

EMBODIMENT 3

Figure 7:
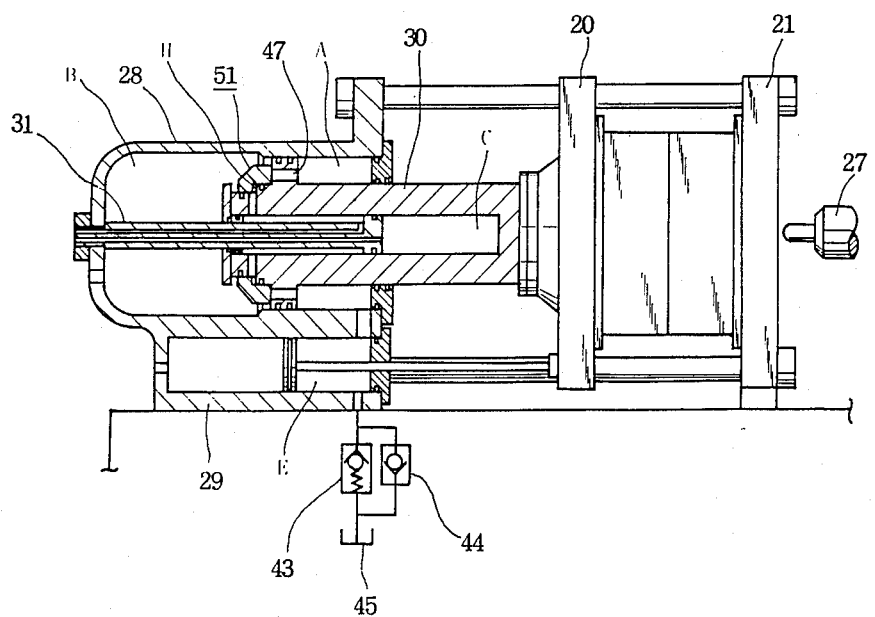
FIG. 7 shows a cross sectional view of the tight clamping status of a third embodiment of the present invention.

The third embodiment is shown in FIG. 7. In this embodiment, the inner diameter of the rear section of the clamping cylinder 28 is formed larger than the inner diameter of the front section thereof. The other components are essentially equal to the device of the second embodiment.

In the high-speed mold opening or closing, so that the piston section of the clamping ram 30 will not contact the inner wall of the rear section of the clamping cylinder 28, slide-resistance is reduced so that faster mold opening or closing is possible. At that time, the oil traveling among the chambers A, B and E is also executed smoothly via the space between the piston section and the inner wall with lower slide resistance. At the tight clamping procedure, the piston section is advanced to the position where the piston section is fit into the inner wall and the tight clamping operation can be executed smoothly.

For the rear large-diameter section to have a clearance for tool operation, machining the clamping cylinder 28 can be executed easily and manufacturing costs can be reduced.

EMBODIMENT 4

Figure 8:
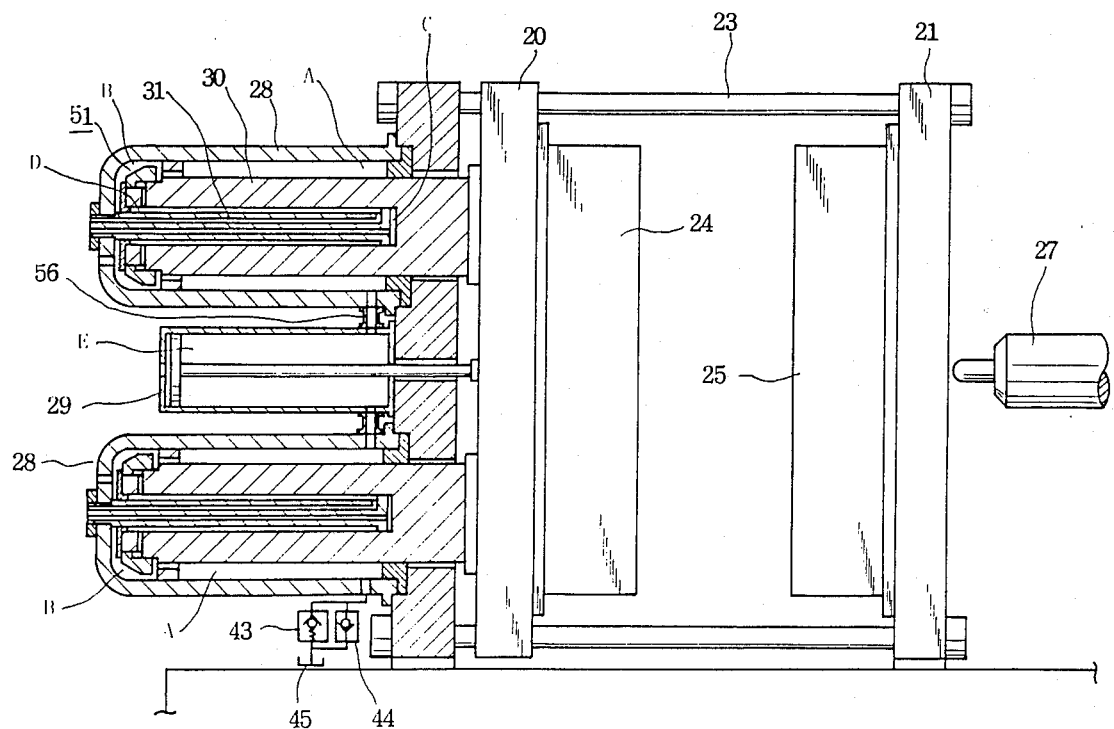
FIG. 8 shows a cross sectional view of the mold opening status of a fourth embodiment of the present invention.

The fourth embodiment is shown in FIG. 8. In this embodiment, a plurality of clamping cylinders 28 are provided side by side, and one support cylinder 29 works in conjunction with the clamping cylinders 28. The chamber E of the support cylinder 29 is connected to each chamber A of the clamping cylinders 28 by hose joints 56.

The total effective pressure receiving area of each chamber B of the clamping cylinder 28 is substantially equal to the sum of the total effective pressure receiving area of each chamber A of the clamping cylinders 28 and the effective pressure receiving area of the chamber E of the support cylinder 29. With this structure, the oil can circulate among the chambers A and B of the clamping cylinders 28 and the chamber E of the support cylinder 29 at the appropriate flowrate.

There are provided a plurality of clamping cylinders 28, so that great tight clamping force, e.g. thousands of tons, can be provided.

Even in a large machine whose movable board 20 is large in size, the movable board 20 can be pressed uniformly so flex of the movable board 20 will be reduced and an uniform clamping force will be available. Precision of the mold clamping device thus can be increased.

In each embodiment described above, it is preferable to design the mold opening and closing in high speed operation to be approximately equal so that an external valve (not shown) is preferably provided to chamber C, whose capacity is larger than chamber D. The oil returned from chamber D is also supplied to chamber C via the external valve (not shown) so that the speed of mold opening will be approximately equal to the speed of closing the mold.

EMBODIMENT 5

Figure 9:
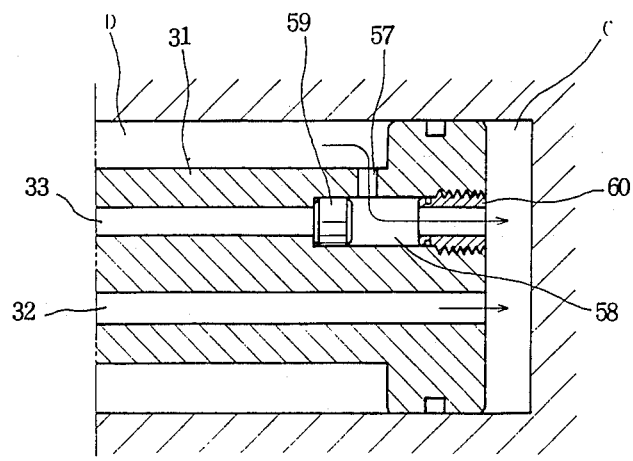
FIGS. 9 and 10 show a partial cross sectional view of the status of pressurizing a chamber according to a fifth embodiment of the present invention.
Figure 10:
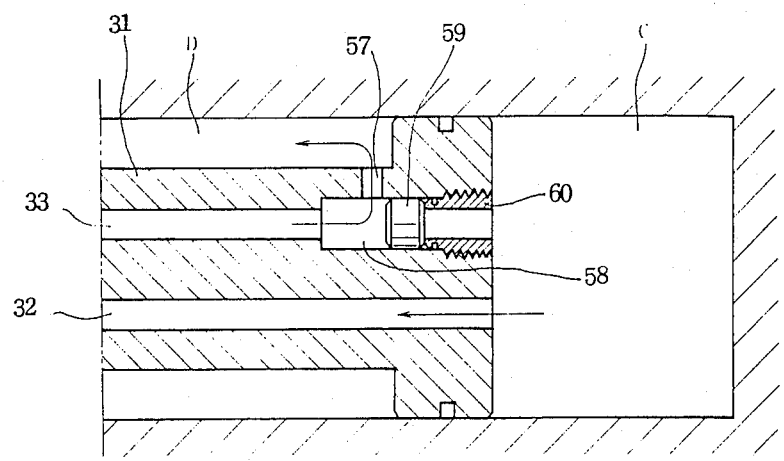

The embodiment shown in FIGS. 9 and 10 is constructed to make the speeds of mold opening and closing approximately equal without external valves.

In this embodiment, an oil path 33, which is provided in the high-speed piston 31 to connect the chamber D, is also connected to the chamber C via a connecting oil path. Chambers C and D are connected to each other via an opening section 57 in chamber C and the oil path 33. The part of the oil path 33 corresponding to the opening section 57 is formed as a large-diameter oil path 58. In this large-diameter oil path 58, there is slidably fitted a valve element 59. A male screw 60 having an oil path is screwed into the female screw section engraved in one end section of the oil path 33 to form a part of the large-diameter oil path 58.

In a high speed mold closure procedure, chambers C and D are connected to each other by retracting the valve element 59 shown in FIG. 9 when the chamber C is pressurized. The chamber D is also pressurized but the pressure in chamber C is larger than that in chamber D so that the oil in chamber D circulates to chamber C and the speed of mold closure is accelerated.

In the mold opening procedure, the mold is opened by pressurization of chamber D, as shown in FIG. 10, valve element 59 is advanced to shut a connection to chamber C and the oil in chamber C is returned to an oil tank. Therefore, mold opening and closing can be executed at approximately the same speed.

In this embodiment, external valves and external pipings are needless and the structure of the device can be simplified and manufacturing costs can be reduced. The oil circulation length between chambers C and D can be shortened so that flow resistance can be reduced in addition to a reduction in energy consumption.

Furthermore, when this embodiment is applied to the embodiments 2 to 4, in the mold closure, the chamber H is pressurized via the chamber D so that the open-close valve 51 is opened. There is an advantage that connection between the chambers A and B is correctly executed.

EMBODIMENT 6

Figure 11:
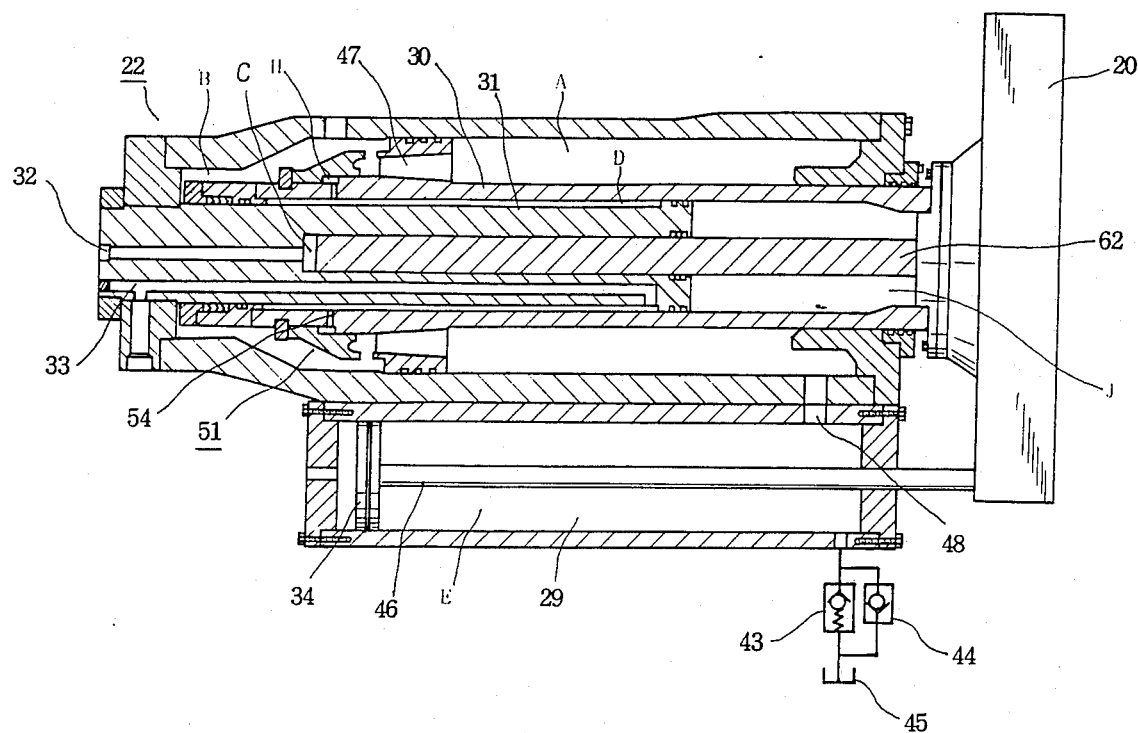
FIG. 11 shows a cross sectional view of the mold clamping device of the present invention in the status of the mold opening of a sixth embodiment of the present invention.
Figure 12:
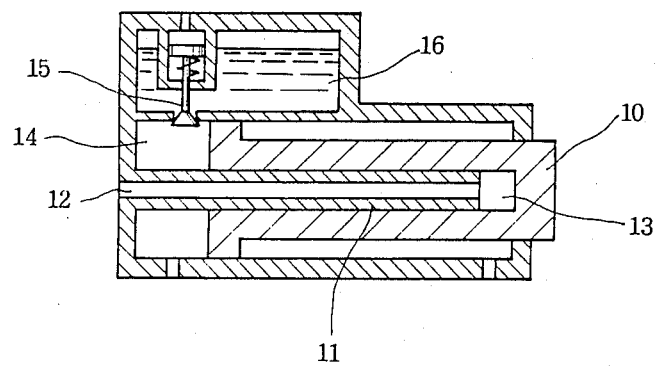
FIG. 12 shows a cross sectional view of a conventional booster ram type mold clamping device.

The sixth embodiment is shown in FIG. 11. In this embodiment, the inner space of the clamping ram 30 is divided into a front chamber J opening to the atmosphere and a rear chamber D by the large-diameter piston section provided at the front end of the high-speed piston 31. The chamber J is opened to the atmosphere. Chambers D and H are connected to each other via through-hole 54.

A piston rod 62, which projects from the inner bottom of the chamber J of the clamping ram 30, is slidably fitted in the high-speed piston 31 from the side of the front end thereof, so there is formed a third chamber C in the high-speed piston 31. Chambers C and D are connected to a hydraulic device (not shown) provided outside of a cylinder block 22 via oil paths 32 and 33. There are provided switching valves (not shown) outside of the cylinder block 22 in the oil paths 32 and 33 so that return oil from chamber C can be supplied to chamber D via the oil path 33.

In the high-speed mold closure operation, chamber C is pressurized; in the tight clamping operation, chamber B is pressurized; and in the high-pressure mold opening, chamber D is pressurized. The operation of the open-close valve 51 is the same as described with respect to the other embodiments.

In this embodiment, the effective pressure receiving area of chamber C can be designed to be small and high-speed and low-pressure mold closure can be executed. The high-pressure mold opening by pressurizing the chamber D can be executed in the same manner as in the above embodiments.

Acceleration of the mold opening can be executed by combining the return oil from chamber C with the oil path 33 via the oil path 32 and the switching valve not shown, so that mold opening and closing can be executed at the same speed.

The mold clamping device can be preferably applied to injection molding machines, die casting machines and the like, as a clamping device.

Preferred embodiments of the instant invention have been explained in detail, but this invention is not restricted to the above embodiments so that any modifications that would be obvious to one skilled in the art are intended to be included within the scope of the following claims.

What is claimed is;

1. A mold clamping device comprising in combination:
   a mold including a movable mold component fixed to a movable board and a fixed mold component fixed to a fixed board;
   a clamping cylinder slidably fitted with a clamping ram whose front end is connected to said movable board of said mold;
   a high-speed piston for opening and closing said mold slidably fitted in said clamping ram from a rear end thereof having a base section fixed on an inner rear wall of said clamping cylinder;
   a support cylinder provided in parallel to said clamping cylinder having a support piston slidably fitted in said support cylinder, a front end of a rod of said support piston being connected to said movable board;
   a rear high pressure chamber and a front oil chamber of said clamping cylinder divided by a piston section of said clamping ram;
   a front oil chamber and an air chamber of said support cylinder divided by said support piston, said air chamber opening to the atmosphere;
   a connecting path connecting said rear high pressure oil chamber and said front oil chamber of said clamping cylinder and said front oil chamber of said support cylinder;
   a front pressure chamber for high speed mold closure and a rear pressure chamber for high speed mold opening of said clamping ram divided by a large-diameter piston section of said high-speed piston;
   means for opening and closing said connecting path, said means opening said path during high speed mold closure and high speed mold opening, and closing the connection from said rear high pressure chamber of said clamping cylinder to said front oil chamber thereof and said front oil chamber of said support cylinder during tight clamping; and
   an oil pressure circuit supplying oil to said front pressure chamber for high speed mold closure of said clamping ram during high speed mold closure, supplying oil to said rear pressure chamber for high speed mold opening thereof during high speed mold opening, and supplying oil to said rear high pressure chamber of said clamping cylinder during tight clamping,
   wherein the sum of the effective pressure receiving area of said front oil chamber of said clamping cylinder and said front oil chamber of said support cylinder is substantially equal to the effective pressure receiving area of said rear high pressure chamber of said clamping cylinder.

2. A mold clamping device according to claim 1, wherein said clamping cylinder and said support cylinder are formed in a body as a cylinder block, and said path which connects said front oil chamber and said rear high pressure chamber of said clamping cylinder and said front oil chamber of said support cylinder is bored in the wall of said cylinder block.

3. A mold clamping device according to claim 1, wherein said means for opening and closing said path is a switching valve which opens and closes said path from said rear high pressure chamber of said clamping cylinder to said front oil chamber of said clamping cylinder and said front oil chamber of said support cylinder.

4. A mold clamping device according to claim 1, wherein said front oil chamber of said clamping cylinder or said front oil chamber of said support cylinder is connected to an oil tank via a spring check valve for releasing oil to said oil tank and a check valve for sucking oil from said oil tank provided in parallel to the spring check valve.

5. A mold clamping device according to claim 1, wherein said piston section of said clamping ram which divides said clamping cylinder into said front oil chamber and said rear high pressure chamber is provided at the rear end of said clamping ram.

6. A mold clamping device according to claim 1, wherein said connecting path comprises a first oil path which is bored through said piston section of said clamping ram to connect said rear high pressure chamber and said front oil chamber of said clamping cylinder and a second oil path which connects said front oil chamber of said clamping cylinder and said front oil chamber of said support cylinder, and said means for opening and closing said connecting path includes a ring valve which is slidably fitted on a large-diameter section and a small-diameter section formed at the rear end of said clamping ram, and which opens and closes said first oil path of the piston section of said clamping ram by an annular end face which slides on the large-diameter section of said clamping ram, an oil chamber for opening said valve which is formed between an inner face of the ring valve and an outer face of the small-diameter section of said clamping ram, and a through-hole bored in said clamping ram to connect said oil chamber to said rear pressure chamber for opening said valve for high speed mold opening.

7. A mold clamping device according to claim 6, wherein third and fourth oil paths which supply oil to said front pressure chamber for high speed mold closure and said rear pressure chamber for high speed mold opening of said clamping ram are respectively bored in said high-speed piston, and the fourth oil path to said rear pressure chamber for high speed mold opening is also connected to said front pressure chamber for high speed mold closure via a connecting oil path whose portion corresponding to the opening to said rear pressure chamber for high speed mold opening has a larger diameter than said fourth oil path, a valve body being slidably provided in the large-diameter portion of said connecting oil path, said valve and body closes the fourth oil path to said rear pressure chamber for high speed mold opening and opens the connecting oil path between the front and rear pressure chamber by oil pressure working in said front pressure chamber for high speed mold closure during mold closure, said valve body opens the fourth oil path to said rear pressure chamber for high speed mold opening and closes the connecting oil path between the front and rear pressure chambers by oil pressure working in said rear pressure chamber for high speed mold opening during mold opening.

8. A mold clamping device according to claim 1, wherein the rear inner diameter of said clamping cylinder is formed larger than the front inner diameter thereof, and the front inner diameter is formed a size such that the piston section of said clamping ram is slidably fitted thereinto.

9. A mold clamping device according to claim 1, wherein a plurality of clamping cylinders are provided, each of said front oil chambers of said clamping cylinders being connected to said front oil chamber of said support cylinder, and the total effective pressure receiving area of said rear high pressure chambers of each of said clamping cylinders is substantially equal to the sum of the total effective pressure receiving area of said front oil chambers of said clamping cylinders and the effective pressure receiving area of said front oil chamber of said support cylinder.

10. A mold clamping device comprising in combination:
a mold including a movable mold component fixed to a movable board and a fixed mold component fixed to a fixed board;
a clamping cylinder slidably fitted with a clamping ram whose front end is connected to said movable board of said mold;
a high-speed piston for opening and closing said mold, slidably fitted in said clamping ram from a rear end thereof having a base section fixed on an inner rear wall of said clamping cylinder;
a support cylinder provided in parallel to said clamping cylinder having a support piston slidably fitted in said support cylinder, a front end of a rod of said support piston being connected to said movable board;
a rear high pressure oil chamber and a front oil chamber of said clamping cylinder divided by a piston section of said clamping ram;
a front oil chamber and an air chamber of said support cylinder divided by said support piston, said air chamber opening to the atmosphere;
a connecting path connecting said rear high pressure oil chamber and said front oil chamber of said clamping cylinder and said front oil chamber of said support cylinder;
a rear pressure chamber for high speed mold opening and a front air chamber of said clamping ram divided by a large-diameter piston section of said high-speed piston, said front air chamber opening to the atmosphere;
a pressure chamber for high speed mold closure in said high-speed piston divided by a piston rod extended from an inner wall of said front air chamber of said clamping ram and slidably fitted into said high-speed piston from a front end thereof;
means for opening and closing said connecting path, said means opening said path during high speed mold closure and high speed mold opening, and closing a portion of said path connecting from said rear high pressure chamber of said clamping cylinder to said front oil chamber thereof and said front oil chamber of said support cylinder during tight clamping; and
an oil pressure circuit supplying oil to said pressure chamber for high speed mold closure of said high-speed piston during high speed mold closure, supplying oil to said rear pressure chamber for high speed mold opening of said clamping ram during high speed mold opening, and supplying oil to said rear high pressure chamber of said clamping cylinder during tight clamping,
wherein the sum of the effective pressure receiving area of said front oil chamber of said clamping cylinder and said front oil chamber of said support cylinder is substantially equal to the effective pressure receiving area of said rear high pressure chamber of said clamping cylinder.

11. A mold clamping device according to claim 10, wherein said clamping cylinder and said support cylinder are formed in a body as a cylinder block, and said path which connects said front oil chamber and said rear high pressure chamber of said clamping cylinder and said front oil chamber of said support cylinder is bored in the wall of said cylinder block.

12. A mold clamping device according to claim 10, wherein said means for opening and closing said path is a switching valve which opens and closes said path from said rear high pressure chamber of said clamping cylinder to said front oil chamber of said clamping cylinder and said front oil chamber of said support cylinder.

13. A mold clamping device according to claim 10, wherein said front oil chamber of said clamping cylinder or said front oil chamber of said support cylinder is connected to an oil tank via a spring check valve for releasing oil to said oil tank and a check valve for sucking oil from said oil tank provided in parallel to the spring check valve.

14. A mold clamping device according to claim 10, wherein said connecting path comprises a first oil path which is bored through said piston section of said clamping ram to connect said rear high pressure chamber and said front oil chamber of said clamping cylinder and a second oil path which connects said front oil chamber of said clamping cylinder and said front oil chamber of said support cylinder, and said means for opening and closing said connecting path includes a ring valve which is slidably fitted on a large-diameter section and a small-diameter section formed at the rear end of said clamping ram, and which opens and closes said first oil path of the piston section of said clamping ram by an annular end face which slides on the large-diameter section of said clamping ram, an oil chamber for opening said valve which is formed between an inner face of the ring valve and an outer face of the small-diameter section of said clamping ram, and a through-hole bored in said clamping ram to connect said oil chamber to said rear pressure chamber for opening said valve for high speed mold opening.

15. A mold clamping device according to claim 10, wherein the rear inner diameter of said clamping cylinder is formed larger than the front inner diameter thereof, and the front inner diameter is formed a size such that the piston section of said clamping ram is slidably fitted thereinto.

16. A mold clamping device according to claim 10, wherein a plurality of clamping cylinders are provided, each of said front oil chambers of said clamping cylinders being connected to said front oil chamber of said support cylinder, and the total effective pressure receiving area of said rear high pressure chambers of each of said clamping cylinders is substantially equal to the sum of the total effective pressure receiving area of said front oil chambers of said clamping cylinders and the effective pressure receiving area of said front oil chamber of said support cylinder.

17. A mold clamping device comprising in combination a mold including a movable mold component fixed to a movable board and a fixed mold component fixed to a fixed board;
- a clamping cylinder slidably fitted with a clamping ram whose front end is connected to said movable board, a high-speed piston which is slidably fitted in said clamping ram from a rear end thereof,
- a support cylinder provided in parallel to said clamping cylinder having a support piston fitted therein, a front end of a rod of said support piston being connected to said movable board;
- a connecting-through-hole for connecting a front chamber and a rear chamber of said clamping cylinder bored in a piston section of said clamping ram, which ram piston section divides said clamping cylinder into said front and rear chambers;
- a front oil chamber and an air chamber of said support cylinder divided by said support piston, said air chamber opening to the atmosphere;
- an oil path connecting the front chamber of said support cylinder to said front chamber of said clamping cylinder;
- an open-close valve for opening and closing said connecting-through-hole, slidably provided on the rear end of said clamping ram;
- a front chamber and a rear chamber in said clamping ram divided by a piston section of said high-speed piston; and
- a through-hole, which is bored in said clamping ram, for connecting a chamber formed in a fitted section of said open-close valve and said clamping ram to said rear chamber of said clamping ram,
- wherein the sum of the effective pressure receiving area of said front chamber of said clamping cylinder and said front chamber of said support cylinder is substantially equal to the effective pressure receiving area of said rear chamber of said clamping cylinder and an inner diameter of a rear section of said clamping cylinder is formed to be larger than an inner diameter of a front section thereof, and the inner diameter of the front section is formed to slidably fit the piston section of said clamping ram.

18. A mold clamping device according to claim 17, wherein front chamber of said clamping ram opens to the atmosphere, and a piston rod extends from an inner wall face of said front chamber open to the atmosphere of said clamping ram, said piston rod being slidably fitted in said high-speed piston to form a third chamber in said high-speed piston.

* * * * *